US010984077B2

(12) United States Patent
Shirasaka et al.

(10) Patent No.: US 10,984,077 B2
(45) Date of Patent: Apr. 20, 2021

(54) INFORMATION PROCESSING APPARATUS, INFORMATION PROCESSING METHOD, AND INFORMATION PROCESSING PROGRAM

(71) Applicant: GoldIP Inc., Tokyo (JP)

(72) Inventors: Hajime Shirasaka, Tokyo (JP); Rieko Harima, Tokyo (JP)

(73) Assignee: AI Samurai Inc., Tokyo (JP)

(*) Notice: Subject to any disclaimer, the term of this patent is extended or adjusted under 35 U.S.C. 154(b) by 159 days.

(21) Appl. No.: 16/102,953

(22) Filed: Aug. 14, 2018

(65) Prior Publication Data

US 2019/0303540 A1 Oct. 3, 2019

(30) Foreign Application Priority Data

Mar. 30, 2018 (JP) .............................. JP2018-069694

(51) Int. Cl.
 *G06F 21/10* (2013.01)
 *G06F 40/166* (2020.01)
 *G06F 40/279* (2020.01)

(52) U.S. Cl.
 CPC ............ *G06F 21/10* (2013.01); *G06F 40/166* (2020.01); *G06F 40/279* (2020.01)

(58) Field of Classification Search
 CPC ...... G06F 21/10; G06F 40/279; G06F 40/166; G06F 17/273; G06F 16/2458;

(Continued)

(56) References Cited

U.S. PATENT DOCUMENTS 10,360,999 B2 * 7/2019 Bernard ................. G16H 50/20
10,650,191 B1 * 5/2020 Sandhu ................. G06F 16/338
(Continued)

FOREIGN PATENT DOCUMENTS

JP 2001-92825 A 4/2001
JP 2008-117010 A 5/2008
(Continued)

OTHER PUBLICATIONS

Corporate press department Kaede Yoshida, "GOLDIP, Simulation of patent examination using AI," [online], Dec. 19, 2017, Nikkei Inc., electronic edition, Nikkei Inc, [Retrieved Aug. 27, 2018], Internet <URL:https://www.nikkei.com/article/DGXMZ024817400Z11C17A2XY0000>.

(Continued)

*Primary Examiner* — Abu S Sholeman
(74) *Attorney, Agent, or Firm* — DLA Piper LLP (US)

(57) ABSTRACT

An information processing apparatus includes: an information obtaining unit for obtaining information on intellectual property from a user terminal operable by a user where the information is entered through the user terminal; a determining unit for determining a possibility for obtaining a right related to the intellectual property based on the obtained information; a determination providing unit for providing the determined possibility to the user terminal; an amendment information generating unit for generating amendment information for the obtained information based on the determined possibility; an information storing unit for storing the obtained information in a user area associated with the user; and an information providing unit for providing the stored information in a browsable manner.

14 Claims, 11 Drawing Sheets

(58) Field of Classification Search
CPC .... G06F 17/2745; G06F 17/24; G06F 17/274; G06F 17/211; G06F 17/3053
See application file for complete search history.

(56) References Cited

U.S. PATENT DOCUMENTS

| | | | |
|---|---|---|---|
| 2005/0210042 A1* | 9/2005 | Goedken | G06F 16/338 |
| 2006/0095377 A1* | 5/2006 | Young | H04L 67/02 705/50 |
| 2007/0294232 A1* | 12/2007 | Gibbs | G06F 16/951 |
| 2008/0005103 A1* | 1/2008 | Ratcliffe | G06Q 10/10 |
| 2008/0228752 A1* | 9/2008 | Huang | G06F 16/382 |
| 2010/0161417 A1* | 6/2010 | Mitsui | G06Q 30/0275 705/14.54 |
| 2015/0113388 A1* | 4/2015 | Barrett | G06F 16/35 715/249 |
| 2017/0270234 A1* | 9/2017 | Nishide | G06F 30/327 |
| 2018/0018564 A1* | 1/2018 | Erenrich | G06N 3/08 |
| 2018/0189909 A1* | 7/2018 | Zellner | G06F 16/2455 |
| 2018/0253486 A1* | 9/2018 | Crouse | G06F 40/131 |
| 2019/0130070 A1* | 5/2019 | Cheng | G06Q 30/0201 |
| 2019/0130508 A1* | 5/2019 | Lantz | G06F 16/3329 |
| 2020/0175441 A1* | 6/2020 | Sukhobokov | G06Q 10/06313 |

FOREIGN PATENT DOCUMENTS

| | | |
|---|---|---|
| JP | 2008-123362 A | 5/2008 |
| JP | 2010-114725 A | 5/2010 |
| JP | 2010-224984 A | 10/2010 |
| JP | 6232607 B1 | 11/2017 |

OTHER PUBLICATIONS

Notice of Reasons for Rejection dated Sep. 4, 2018, of counterpart Japanese Application No. 2018-069694, along with an English translation.

English translation of the International Search Report dated Jun. 11, 2019, of counterpart International Application No. PCT/JP2019/010893.

Corporate press department Kaede Yoshida, "GOLDIP, Simulation of patent examination using AI," [online], Dec. 19, 2017, Nikkei Inc., electronic edition, Nikkei Inc. [Retrieved Aug. 27, 2018], https://www.nikkei.com/article/DGXMZ024817400Z11C17A2XY0000>, including an English translation.

* cited by examiner

FIG. 7

| REGISTRATION DATE | PROJECT NUMBER | TITLE | OBJECT | NAME | BELONGING | EXPERIMENT RECORDS | INVENTION CONTENTS | SIGNATURE | DETERMINATION RESULT | AMENDMENT INFORMATION | RE-DETERMINATION RESULT |
|---|---|---|---|---|---|---|---|---|---|---|---|
| 2018/03/05 | 2017-1234 | xxxxxxxx | xxxxxxxx | xxxx | xxxxx | xxxxxxxx | A | xxx | 30% | +H | 50% |
| 2018/03/06 | 2017-5678 | xxxxxxxx | xxxxxxxx | xxxx | xxxxx | xxxxxxxx | — | xxx | — | — | — |
| 2018/03/07 | 2017-1234 | xxxxxxxx | xxxxxxxx | xxxx | xxxxx | xxxxxxxx | — | xxx | — | — | — |
| 2018/03/08 | 2017-1234 | xxxxxxxx | xxxxxxxx | xxxx | xxxxx | xxxxxxxx | a1 | xxx | 40% | +J | 60% |
| 2018/03/09 | 2017-1234 | xxxxxxxx | xxxxxxxx | xxxx | xxxxx | xxxxxxxx | a1+B | xxx | 90% | — | — |
| 2018/03/12 | 2017-5678 | xxxxxxxx | xxxxxxxx | xxxx | xxxxx | xxxxxxxx | C+D | xxx | 50% | +E | 70% |
| 2018/03/13 | 2017-1234 | xxxxxxxx | xxxxxxxx | xxxx | xxxxx | xxxxxxxx | — | — | — | — | — |
| 2018/03/14 | 2017-5678 | xxxxxxxx | xxxxxxxx | xxxx | xxxxx | xxxxxxxx | C+d1 | — | 80% | — | — |
| ...... | ...... | ...... | ...... | ...... | ...... | ...... | ...... | ...... | ...... | ...... | ...... |

FIG. 11

PATENT ABILITY RANK [B]

| ELEMENT | USER3456B1.PDF | USER7002B1.PDF | USER4084B1.PDF |
|---|---|---|---|
| An intellectual property recording apparatus comprising: | PATENT MATCHRATE 69% | PATENT MATCHRATE 65% | PATENT MATCHRATE 84% |
| a recording unit configured to record intellectual property information and stores as information; | PATENT MATCHRATE 73% | PATENT MATCHRATE 69% | PATENT MATCHRATE 66% |
| a input unit configured to input a process to query information recorded by the changes of correction recorded in the recording unit; | PATENT MATCHRATE 57% | PATENT MATCHRATE 67% | PATENT MATCHRATE 53% |
| a management unit configured to receive information regarding intellectual property associated with the user or operation of information regarding the information in the recording unit; | PATENT MATCHRATE 70% | PATENT MATCHRATE 62% | PATENT MATCHRATE 58% |
| a calculation unit configured to calculate the right acquisition possibility of the intellectual property based on the information regarding the intellectual property; | PATENT MATCHRATE 67% | PATENT MATCHRATE 75% | PATENT MATCHRATE 90% |
| and a unit is configured to output a support function of the parameter based on information on the right acquisition possibility calculated by the calculation and. | PATENT MATCHRATE 68% | PATENT MATCHRATE 59% | PATENT MATCHRATE 54% |

# INFORMATION PROCESSING APPARATUS, INFORMATION PROCESSING METHOD, AND INFORMATION PROCESSING PROGRAM

TECHNICAL FIELD

This disclosure relates to an information processing apparatus, an information processing method, and an information processing program.

BACKGROUND

Apparatuses for evaluating inventions before filing applications have been developed. Japanese Unexamined Patent Application Publication No. 2010-224984 (JP 2010-224984 A) discloses a patent description evaluation/preparation work support apparatus that stores information on intellectual property, and evaluates and supports preparation of an application document before filing an application. The patent description evaluation/preparation work support apparatus disclosed in JP 2010-224984 A stores information on a published patent gazette including a notification of reasons of rejections, and performs a similarity search of an application document before filing the application on the stored information to predict a description of a notification of reasons of rejections expected to be issued.

Further, an engineer (inventor) who has created an invention in research and development may perform a prior art search to check whether the invention created by herself/himself obtains a right on intellectual property such as a patent right. In the prior art search, for example, in a database in which prior art may be searched, a keyword indicating the feature of the invention created by herself/himself is entered and the prior art searched to check whether similar prior art is present. This allows the engineer to check the possibility of obtaining the right with respect to the created invention from the result of the prior art search and consider applicability of the patent application. When the engineer creates a plurality of inventions in daily research and development, the engineer performs a prior art search on the invention each time she/he creates the invention. This allows her/him to check the possibility of obtaining the right for each invention.

However, in projects such as continuing research and development, multiple intellectual property such as related inventions are created, and new intellectual property may be created by adding new creative parts to the related intellectual property created in the past or amending, as a conversion, the related intellectual property created in the past. The prior art searches in which the possibility of obtaining the right in the intellectual property is searched may be similar to each other in the related intellectual property. For example, when documents relating to the intellectual property created in the past or documents in search results of the prior art search are stored, it may take time and effort to search the stored documents. In this case, it may be difficult to determine the possibility of obtaining the right of the newly created intellectual property by referring to the prior art search performed in the past, and create new intellectual property by modifying the intellectual property created in the past.

It could therefore be helpful to provide an information processing apparatus, an information processing method, and an information processing program that easily determines the possibility of obtaining the right of the created intellectual property and facilitating the creation of new intellectual property.

SUMMARY

We thus provide:

(1) An information processing apparatus includes: an information obtaining unit that obtains information on intellectual property from a user terminal operable by a user where the information is entered through the user terminal; a determining unit that determines a possibility of obtaining a right related to the intellectual property based on the obtained information; a determination providing unit that provides the user terminal with the determined possibility; an amendment information generating unit that generates amendment information in which the obtained information is amended based on the determined possibility; an information storing unit that stores the obtained information in a user area associated with the user; and an information providing unit that provides the stored information in a viewable manner.

(2) In the information processing apparatus, the amendment information generating unit may generate the amendment information that proposes deletion or addition of a feature in the obtained information.

(3) In the information processing apparatus, the amendment information generating unit may generate the amendment information further based on the stored information.

(4) In the information processing apparatus, the information storing unit may associate and store date and time when the information is obtained with the obtained information, and the information providing unit may provide the information associated with the date and time.

(5) In the information processing apparatus, the information obtaining unit may obtain the information created by the user based on the information provided in a viewable manner.

(6) In the information processing apparatus, the information storing unit may store the obtained information using a distributed ledger technology.

(7) The information processing apparatus further includes a certificate information providing unit that provides certificate information for certifying an existence of the stored information.

(8) The information processing apparatus further includes an authentication information obtaining unit that obtains authentication information for authenticating the information provided in a viewable manner. The information storing unit may associate and store the obtained authentication information with the information.

(9) The information processing apparatus further includes an information collecting unit that collects the information stored in a plurality of the user areas and a trend aggregating unit that aggregates trends of the information based on the collected information.

(10) The information processing apparatus further includes an examination result obtaining unit that obtains an examination result to obtain the right. The determining unit may machine-learn the obtained examination result and determine the possibility.

(11) In the information processing apparatus, the determining unit may re-determine the possibility of obtaining the right on the intellectual property based on the generated amendment information.

(12) In the information processing apparatus, the amendment information generating unit may generate a plurality of pieces of the amendment information. The determining unit may re-determine the possibility of obtaining the right based on each of the generated plurality of pieces of the amendment information.

(13) The information processing apparatus further includes a value evaluating unit that evaluates a value of the right related to the intellectual property based on the obtained information.

(14) In the information processing apparatus, the amendment information generating unit may simulate the information in the generated amendment information.

(15) An information processing method includes: obtaining information on intellectual property from a user terminal operable by a user where the information is entered through the user terminal; determining a possibility of obtaining a right related to the intellectual property based on the obtained information; providing the user terminal with the determined possibility; generating amendment information in which the obtained information is amended based on the determined possibility; storing the obtained information in a user area associated with the user; and providing the stored information in a viewable manner.

(16) A computer-readable recording medium storing an information processing program to allow a computer to execute functions of: obtaining information on intellectual property from a user terminal operable by a user where the information is entered through the user terminal; determining a possibility of obtaining a right related to the intellectual property based on the obtained information; providing the user terminal with the determined possibility; generating amendment information in which the obtained information is amended based on the determined possibility; storing the obtained information in a user area associated with the user; and providing the stored information in a viewable manner.

An information processing apparatus, an information processing method, and an information processing program that easily determines the possibility of obtaining the right of the created intellectual property and facilitating the creation of new intellectual property are provided.

BRIEF DESCRIPTION OF THE DRAWINGS

Features, advantages, and technical and industrial significance of examples of the disclosure will be described below with reference to the accompanying drawings, in which like numerals denote like elements.

FIG. 7 is a diagram illustrating an example of information provided from the information processing apparatus.

FIG. 11 is a diagram illustrating an example of the UI provided from the information processing apparatus.

DETAILED DESCRIPTION

Hereinafter, examples of an information processing apparatus, an information processing method, and an information processing program will be described in detail with reference to the drawings.

Figure 1:
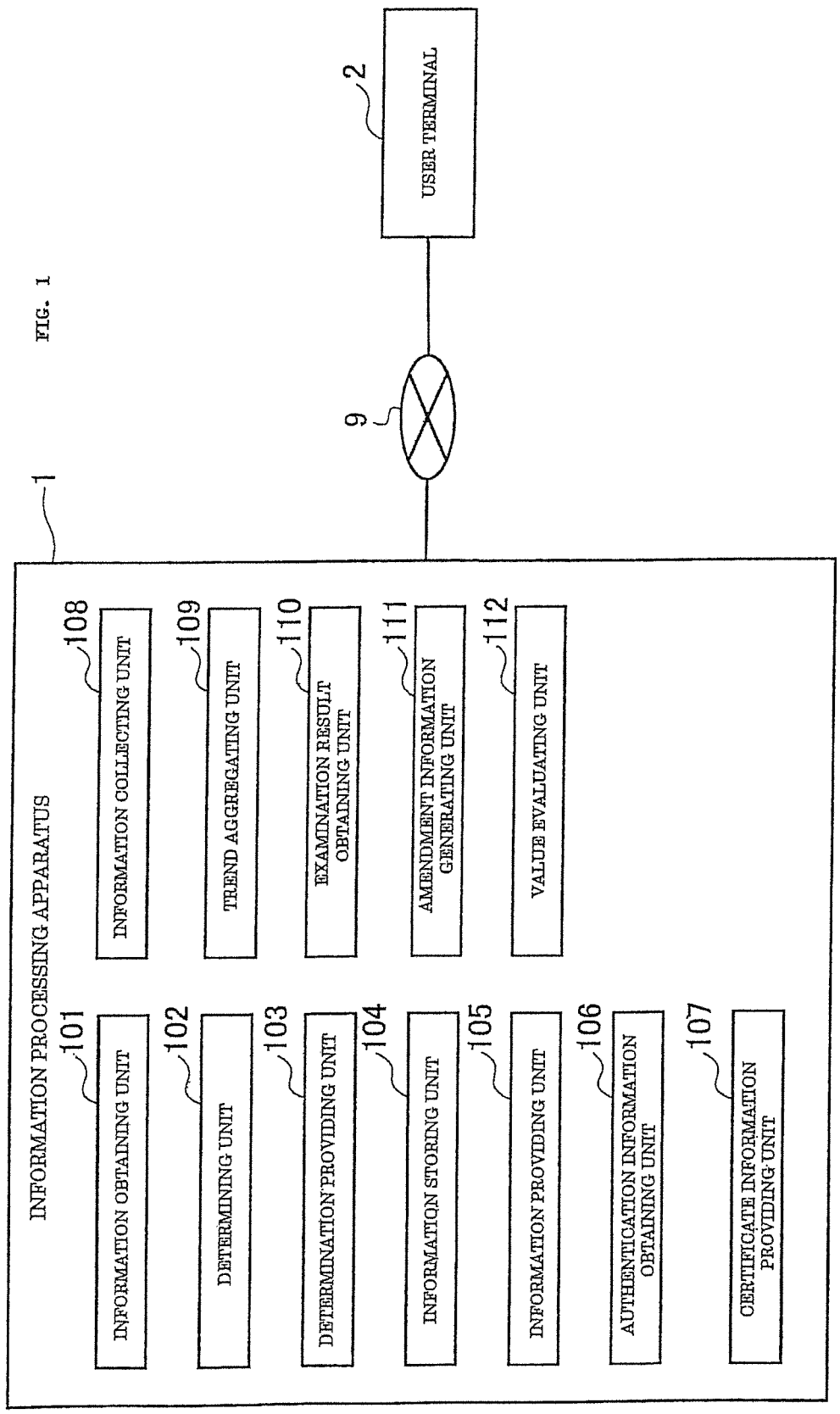
FIG. 1 is a block diagram illustrating an example of a software configuration of an information processing apparatus according to an example.

First, with reference to FIG. 1, the software configuration of the information processing apparatus will be described. FIG. 1 is a block diagram illustrating an example of the software configuration of the information processing apparatus.

In FIG. 1, an information processing apparatus 1 includes functional units, i.e., an information obtaining unit 101, a determining unit 102, a determination providing unit 103, an information storing unit 104, an information providing unit 105, an authentication information obtaining unit 106, a certificate information providing unit 107, an information collecting unit 108, a trend aggregating unit 109, an examination result obtaining unit 110, an amendment information generating unit 111, and a value evaluating unit 112. A description will be made assuming that each of the functional units of the information processing apparatus 1 is a functional module embodied by an information processing program (software) that controls the information processing apparatus 1. The information processing program operates on the information processing apparatus 1. That is, the information processing apparatus 1 corresponds to a device on which the information processing program operates. The information processing apparatus 1 may include, for example, a general-purpose apparatus such as a server device or a desktop PC.

The information obtaining unit 101 obtains information on intellectual property entered through the user terminal 2. The user terminal 2 corresponds to a terminal device operable by a user, and may include, for example, a desktop PC, a notebook PC, a tablet PC, and a smartphone. Intellectual property is an idea or creation produced by human intellectual activities. The intellectual property may include, for example, an invention, a utility model, a design, a trademark, a literary work, a circuit layout or a new breed of plant. Also, the intellectual property may be, for example, a figure, table, graph, sketch or photograph (such as a drawing) that explains the contents of the intellectual property, or a document that describes the drawings. The information on the intellectual property corresponds to information that determines the possibility of obtaining the right related to the intellectual property described above. Rights related to the intellectual property may include, for example, a patent right, utility model right, design right, trademark right, copyright, layout-design exploitation right or plant breeders' right. The information that determines the possibility of obtaining the right related to intellectual property corresponds to information that determines whether a legal acquisition requirement of intellectual property right is satisfied, for example, information that determines whether patent requirements or registration requirements for a utility model, a design or a trademark are satisfied. For example, when the intellectual property is directed to an invention, the information that determines the possibility of obtaining the right corresponds to information such as the description (such as the recitation of the claims and the object of the invention) or the drawings. Further, when where the intellectual property is directed to a design, the information that determines the possibility of obtaining the right corresponds to information such as the drawings related to a shape, a pattern or a color, or a combination thereof. When the intellectual property is directed to a trademark, the information that determines the possibility of obtaining the right corresponds to the identification mark of goods or services. The information obtaining unit 101 obtains information on the intellectual property entered through the user terminal 2 from the user terminal 2.

The information on the intellectual property may include information other than the information that determines the possibility of obtaining the right. The information other than the information that determines the possibility of obtaining the right may correspond to information in which a process until creation of an invention or design is stored, or accompanying information such as a material or apparatus prepared for experiments, an experiment result, a title of research and development, an object of research and development, a name of an engineer, a name of a group to which the engineer belongs, and a project number. The accompanying information may include information on the access authority to the information on the obtained intellectual property. The access authority corresponds to an authority to execute processes such as browsing, editing, deleting, and authentication on information and, for example, an access authority for the whole processes is given to an engineer who has stored the information on intellectual property, an access authority for a browsing process is given to an engineer who has cooperated for creation of the intellectual property, or an access authority for performing the authentication process is given to an authenticator (described below) authenticating the information on the intellectual property. The information obtaining unit 101 may obtain the accompanying information as the information on the intellectual property.

In the following description, the intellectual property is an invention which is exemplified, but the intellectual property is not limited to the invention. That is, creation of intellectual property may include selection of an identification mark in a trademark, for example.

The determining unit 102 determines the possibility of obtaining a right related to the intellectual property based on the information obtained by the information obtaining unit 101. The determining unit 102 determines, for example, the possibility of obtaining a patent right. For the determination of the possibility of obtaining a patent right, for example, it is determined whether the invention specified from the sentences obtained by the information obtaining unit 101 satisfies patent requirements. Patent requirements may include, for example, novelty or inventive step (novelty and the like). Novelty and the like may be determined based on whether the invention has novelty or the like in contrast to the cited invention. The determining unit 102 determines the possibility of obtaining the right in the recognition process of the obtained invention, and the search and determination process of the cited invention, which will be described below, for example.

Recognition Process of Obtained Invention

The determining unit 102 analyzes a word, a syntax, or a citation relationship included in a sentence illustrating the contents of the invention obtained by the information obtaining unit 101, and extracts the meanings of the sentence to recognize the invention. The extraction of the meanings of the sentence is performed by decomposing the sentence into parts of speech (words) such as nouns and postpositional particles, for example, and then analyzing the composition of the sentence. Analysis of the composition of the sentence is performed by analyzing phrases composed of words and dependency between the phrases, for example.

Retrieval and Determination Process of Cited Invention

The determining unit 102 searches a cited invention similar to the recognized invention and determines the possibility of obtaining a right based on the presence or absence of the similar invention. Whether the invention is similar is determined, for example, by recognizing the meanings (implication) of the recognized invention and determining whether the cited invention having similar implications are searched. The cited inventions are published patent documents or non-patent documents. For the patent documents, for example, documents such as patent gazettes published by national patent offices are used. Further, for the non-patent documents, documents published in scientific journals, newspapers, and web sites, for example, may be employed. The patent documents or the non-patent documents are stored in a dedicated database (not shown), for example, and are searchable through the determining unit 102. The similarity of the meanings of the inventions is determined by, for example, extracting keywords from the words included in the recognized invention, searching synonyms for the keywords from a database (not shown) in which synonyms and derivatives (synonyms or the like) are stored, and then determining whether the semantic contents of the sentences constituted by the synonyms or the like are similar. The determining unit 102 may compute the degree of similarity of the sentences as similarity. If the computed degree of similarity of the sentences is low, the determining unit 102 may determine that the possibility of obtaining a right is high. In contrast, if the computed degree of similarity of the sentences is high, the determining unit 102 may determine that the possibility of obtaining a right is low. The determining unit 102 may determine the possibility based on rank, for example, as rank "S (considerably high)," "rank A (high)," "rank B (possibly)," and "rank C (low)" depending on the possibility of obtaining a right.

The determining unit 102 determines the possibility of obtaining a right based on the examination results of obtaining a right in the past performed by the patent offices of the countries. The examination results of obtaining a right correspond to the examination results in the inventions of the applications, the cited references, and the comparisons between the inventions and the references (whether the inventions are rejected based on the cited references). The determining unit 102 may compute the degree of similarity between the sentences of the inventions of the applications and the sentences of the cited references, and learn the comparisons between the computed degree of similarity and the examination results to determine the possibility of obtaining a right. The determining unit 102 learns the comparisons between the computed degree of similarity and the examination results in the past so that the determinations by the patent offices in the past are employed as a reference for determination. This improves a determination accuracy on the possibility of obtaining a right. The examination result obtaining unit 110 obtains the examination results of obtaining a right. The examination results may be obtained from the examination information published by the patent offices of the countries, for example. The determining unit 102 may determine the possibility of obtaining a right based on the examination results obtained by the examination result obtaining unit 110.

The determination providing unit 103 provides the user terminal 2 with the possibility of obtaining a right determined by the determining unit 102. The determination providing unit 103 provides the user terminal 2 with the display data to display the characters S, A, B and C, for example, according to the possibility of obtaining a right determined for the ranks of S to C by the determining unit 102. Also, the determination providing unit 103 may provide the user terminal 2 with the character information according to the possibility of obtaining a right. The character information represents a person or an animal appearing in a novel, a cartoon, a movie, an animation, or a computer game as computer-usable digital data. The character information may include character's emotions. For example, the determination providing unit 103 may provide the user terminal 2 with display data of a character with a cheerful facial expression when the possibility for obtaining a right is rank S.

The information storing unit 104 stores the information on the intellectual property obtained by the information obtaining unit 101 in a user area associated with the user. The user area associated with the user is a storage area that is independently used by each user. The user area corresponds to, for example, an area used by a user performing user authentication such as login. Each user stores the information on the intellectual property in the corresponding user area or browse, edit, or delete the stored information on the intellectual property. The information storing unit 104 may store the determination results determined by the determining unit 102 as the information on the intellectual property.

The information storing unit 104 associates and stores the date and time (obtained date and time) when the information on the intellectual property is obtained with the information on the obtained intellectual property. For example, for the date and time, time information is obtained from a real-time clock (RTC) (not shown) of the information processing apparatus 1. The information storing unit 104 may store the information on the intellectual property and the obtained date and time to prevent falsification. For example, the information storing unit 104 may store the information on the obtained intellectual property utilizing a distributed ledger technology. The distributed ledger technology (DLT) corresponds to a technology that stores information by the "distributed" mechanism in which the participants share the same ledger basically on the Internet in place of the "centralized" mechanism that entrusts the management of the ledger to a specific subject. The information on the intellectual property is stored utilizing the distributed ledger technology to make it difficult to falsify the stored information. The information storing unit 104 stores the information on the intellectual property along with the obtained date and time utilizing the distributed ledger technology to make it difficult to falsify the date and time as well. The distributed ledger technology is embodied based on a blockchain technology, for example.

The information providing unit 105 provides the information on the intellectual property stored in the information storing unit 104 (the information may include the determination results determined by the determining unit 102) to be browsed. The information providing unit 105 provides the information on the intellectual property as the display data that is browsed through the user terminal 2, for example. The information providing unit 105 provides the information on the intellectual property to be browsed to allow the user to browse the contents of the invention stored in the past, the processes of achieving the invention, and the determination results of the possibility of obtaining a right, for example. If the user associates and stores a plurality of pieces of the information on the intellectual property, the information providing unit 105 may provide the pieces of the information on the intellectual property. Further, the information providing unit 105 may provide the information in a browsable manner only by the members of the same research project, members of the same department, or members of the same company, for example.

Engineers may create new intellectual property based on the intellectual property created in the past. For example, an invention with a low possibility of obtaining a right, to which some configuration is added, or an invention in which any one of the configurations is changed to another configuration may increase the possibility of obtaining a right. The user may consider a creation of a new invention by considering a configuration to be added to an invention with a low possibility of obtaining a right created in the past and browsed (or created by another engineer), or applying the configuration of the invention created in the past to another invention. The information providing unit 105 may provide the stored information on the intellectual property, for example, such that the information is editable or a new piece of intellectual property is added to the information in contrast to the intellectual property in the past. This provides the user with opportunities or motivation to create intellectual property. The information obtaining unit 101 obtains the information on the intellectual property newly created by the user based on the information on the intellectual property (information on the base intellectual property) provided in a browsable manner. The determining unit 102 determines the possibility of obtaining a right for the information on the newly created intellectual property obtained by the information obtaining unit 101. This allows the user to easily compare the possibility of obtaining a right for the information on the base intellectual property with the possibility of obtaining a right for the information on the newly created intellectual property. The information processing apparatus 1 provides a cycle of obtaining, storing, and providing the information on the intellectual property, creating new intellectual property, and obtaining information on new intellectual property. The use of the cycle allows the user to create intellectual property having a high possibility of obtaining a right.

The information providing unit 105 may also provide information on the obtained date and time along with the information on the intellectual property. For example, when the information storing unit 104 stores a plurality of pieces of the information on the intellectual property, the information providing unit 105 may sort and provide the stored information on the intellectual property in time series in a browsable manner. The user browses the information on the intellectual property sorted in time series to check their research results and development processes in time series.

The information on the intellectual property stored in the user area may be shared with other users. For example, when the information on the intellectual property is an invention created by a plurality of inventors, the user stores the contents of the invention in the information storing unit 104 to allow a plurality of users (inventors) to use them. The information providing unit 105 provides the users with the information on the intellectual property to be shared by them. Especially when a plurality of engineers are engaged in research and development in collaborative research, for example, they share the information on the intellectual property to clarify the actual creators of the invention among the engineers.

Further, the information providing unit 105 may provide a terminal device possessed by a certifier (which may be the same as the user terminal 2) with the information on the intellectual property in a browsable manner. The certifier is a person who authenticates the presence of the information on the intellectual property stored in the information storing unit 104. The certifier browses the information on the intellectual property stored in the information storing unit 104 and performs an authentication process of authenticating that the browsed information on the intellectual property is certainly created by the user. The authentication process for the information on the intellectual property is performed, for example, such that the certifier operates a predetermined section on the view screen for the information on the intellectual property to add an electronic certificate (signature) to the information on the intellectual property. The authentication result made on the information on the intellectual property is provided to the information processing apparatus 1 as authentication information. That is, the authentication information corresponds to information indicating that the information on the intellectual property provided to the certifier in a browsable manner has been authenticated.

The authentication information obtaining unit 106 obtains the authentication information. For example, when the certifier authenticates the information on the intellectual property by the user terminal 2, the authentication information obtaining unit 106 obtains the authentication information from the user terminal 2. The obtained authentication information is associated with the information on the authenticated intellectual property and stored in the information storing unit 104. The information storing unit 104 may store the authenticated information of the intellectual property such that the information is prevented from being edited (falsified). For example, the information storing unit 104 stores the information on the intellectual property utilizing the distributed ledger technology after the authentication information is obtained such that the information on the intellectual property after the authentication is prevented from being falsified.

The certificate information providing unit 107 provides certification information to certify the presence of the information on the intellectual property stored in the information storing unit 104. The certificate information corresponds to information that certifies that the information on the intellectual property is authenticated by the certifier and the information on the intellectual property is certainly created by the user. For example, a hash value of the information on the intellectual property may be sent to a publicly authenticated time stamping station such that a time stamp sent back with the coordinated universal time may be used for the certification information. The use of the time stamp allows the certification information to prove the time of presence of the information on the intellectual property and the integrity of the information.

Use as Laboratory Note

The information processing apparatus 1 may be utilized as a laboratory note (experiment notebook). The laboratory note refers to a note that records the research processes. The certifier specifies the contents of the research and the date and time and makes a signature to certify the progress of the research in the laboratory note to clarify when the invention is created. The laboratory note may be employed to prove the prior invention, especially in the United States. As described above, the information processing apparatus 1 obtains and stores the information on the intellectual property and records the date and time when the information on the intellectual property is obtained. As described above, the information on the intellectual property includes accompanying information such as the title of research and development, the purpose of research and development, the name of the engineer, the name of the group to which the engineer belongs, and the project number. This allows the information processing apparatus 1 to be utilized satisfying the requirements as the laboratory note. The certificate information providing unit 107 provides information to prove the time of presence of the information on the intellectual property and the integrity of the information in the same manner as the laboratory note does.

Aggregation of Collected Information

The information collecting unit 108 collects information on intellectual property stored in a plurality of user areas. The information on intellectual property stored in the user areas corresponds to information on intellectual property created by a plurality of users. The users develop various technologies and create various intellectual property accordingly. The information collecting unit 108 collects information on various intellectual property created by the users.

The trend aggregating unit 109 aggregates trends of the information on the intellectual property based on the information on the intellectual property collected by the information collecting unit 108. The trends of the information on the intellectual property correspond to, for example, information indicating the technology in which the research and development have been actively conducted in industry. The trend aggregating unit 109 aggregates the trends of the information on the intellectual property, allowing the unit 109 to gather trends of technological development in users. For example, the trend aggregating unit 109 extracts and aggregates keywords indicating the trends from the information on the intellectual property collected by the information collecting unit 108. The aggregation of keywords may count the number of cases for each synonym using a database in which synonyms are stored as described in the determining unit 102, for example. Also, the trend aggregating unit 109 may estimate the classification of the international patent classification from the extracted keywords and totalize the number of cases for each classification.

Since the information on the intellectual property stored by each user corresponds to highly confidential information, the information collecting unit 108 and the trend aggregating unit 109 may have a specification that can be applied to operations that conform to requirements (ISO/IEC 27001) of Information Security Management System (ISMS), for example. That is, the information collecting unit 108 and the trend aggregating unit 109 may be configured to meet the requirements on confidentiality, integrity and availability of information. For example, the range of the information on the intellectual property collected by the information collecting unit 108 and aggregated by the trend aggregating unit 109 may be set to be limited to the range defined by the ISMS. Further, the information collecting unit 108 may collect only keywords and classification information (for example, international patent classification) in the information on the intellectual property.

Machine Learning of Examination Result

The examination result obtaining unit 110 obtains the examination results of obtaining a right. The examination results of obtaining a right correspond to results of the examination of the intellectual property performed at the Patent Office and include information such as the application documents to be examined, the notice of reasons of rejections, cited references, amendments, arguments, and decision. The examination result obtaining unit 110 obtains the examination results from, for example, the gazettes published by each patent office of each country and the examination progress.

The determining unit 102 may machine-learn the examination results obtained by the examination result obtaining unit 110 to determine the possibility of obtaining a right. For example, the determining unit 102 performs machine learning (supervised learning) with datasets including the invention related to the application and the cited references as inputs and the results of the examination as outputs, and models the learned datasets to determine the possibility of obtaining a right. The datasets may be modeled as different models depending on, for example, the country, applicable law (including amendment of law), and field of the invention. The determining unit 102 uses the learning results learned in the modelings to improve the accuracy of determining the possibility of obtaining a right. Further, the determining unit 102 machine-learns new examination results obtained by the examination result obtaining unit 110 so that even if the tendency of the examination in the patent office has changed, the determining unit 102 determines the possibility of obtaining a right in accordance with the change of the tendency. As for the machine learning, supervised learning techniques or unsupervised learning techniques may be used. As a learning technique of machine learning, for example, a neural network (including deep learning), support vector machine, clustering, or Bayesian network may be used.

The amendment information generating unit 111 generates amendment information by amending the information on the intellectual property obtained by the information obtaining unit 101 based on the possibility for obtaining a right determined by the determining unit 102. The amendment information includes at least one of an amendment of the information on the intellectual property, co-creation of the information on the intellectual property, and independent creation of the information on the intellectual property. In the following description of the amendment information generating unit 111, an example of when the intellectual property is an invention will be described. Artificial Intelligence (AI) generates the amendment information.

Amendment of Invention

For example, the amendment information generating unit 111 generates amendment information in which features are added to or deleted from the invention. Generally, although the amendment that adds the features of the invention limits the scope of the right, the amendment increases the possibility of obtaining the right. That is, the amendment information generating unit 111 generates amendment information that increases the possibility of obtaining a right by adding the features of the invention. For example, when the determining unit 102 determines that the possibility of obtaining a right is low, the amendment information generating unit 111 considers generation of amendment information that increases the possibility of obtaining a right by amending the information on the intellectual property. The amendment information generating unit 111, for example, adds the feature(s) (wordings or sentences) that has improved the possibility of obtaining a right in the past examination and been learned based on the machine learning to the features of the invention to generate amendment information that improves the possibility of obtaining a right based on the past examination.

In contrast, when the determining unit 102 determines that the possibility of obtaining a right is high, the amendment information generating unit 111 may consider generation of amendment information that reduces the possibility of obtaining a right in the amendment of the information on the intellectual property. Although the amendment to delete the feature(s) of the invention may reduce the possibility of obtaining a right, the amendment may expand the scope of the right of the invention. The deletion of the feature(s) of the invention allows the amendment information generating unit 111 to generate amendment information that expands the scope of the right. The amendment information generating unit 111 generates amendment information in which the feature(s) that is less affecting the possibility for obtaining a right is deleted to expand the scope of the right of the invention while maintaining the possibility of obtaining a right.

Also, the amendment information generating unit 111 may generate the amendment information further based on the information on the intellectual property stored in the information storing unit 104. The amendment information generating unit 111 refers to the intellectual property that has been created by an engineer in the past and stored in the information storing unit 104 to utilize the knowledge of the engineer so that the amendment information generating unit 111 may generate amendment information similar to the amendment information created by the engineer him/herself on behalf of the engineer. The amendment information generating unit 111 may generate amendment information based on the information on the intellectual property in the information storing unit 104 stored by other engineers (for example, an engineer of the same company).

Co-Creation of Invention

Further, the amendment information generating unit 111 may generate amendment information for co-creation of an invention with engineer(s). The amendment of the invention corresponds to the addition of the feature(s) to the sentences showing the contents of the invention obtained by the information obtaining unit 101. In contrast, the co-creation of the invention corresponds to the invention in which the degree of addition of the feature(s) has progressed to reach a creation of the invention. There is no clear difference between the amendment of the invention and the creation of the invention. However, the AI may propose addition of the feature(s) of the invention to the extent that the idea of the engineer fails to reach. The operation in such a case may be close to the creation of the invention rather than the amendment of the invention. For example, the amendment information generating unit 111 may generate amendment information based on the trend of the technology aggregated in the trend aggregating unit 109, i.e., based on the trend in the technical field that may be different from the technical field of the engineer. The amendment information generating unit 111 expands the range of the amendment information to be generated, allowing the co-creation of inventions by human beings and the AI.

Independent Creation of Invention

Further, the amendment information generating unit 111 may generate amendment information for independent creation of the invention. The independent creation of invention corresponds to creation of invention from information that lacks the feature(s) of the invention as a basis of amendment. For example, the amendment information generating unit 111 may create, from a sentence illustrating an object or a subject of the invention, a means (invention) of achieving the object or subject. For example, the amendment information generating unit 111 may machine-learns means to achieve the subject or object in the information collected from patent publications and technical papers and the information stored in the information storing unit 104 to create, from the object of the invention, the means to achieve the object independently.

The inventions created by the AI may include inventions having defects such as difficulty or impossibility of implementation. The amendment information generating unit 111 may apply simulation technology to the created invention to detect the defects of the invention and exclude the invention from the target of creation. The simulation technology may include, for example, a technology of fluid analysis on a model modeled by CAD, a technology of simulating production of drugs, a technology of calculating costs or time required for implementation, and a technology of detecting scientific inconsistency to be used.

Amendment of the information on the intellectual property may be a divisional application of an application for design registration or an application for trademark registration. For example, the amendment information generating unit 111 generates amendment information that adds feature(s) that has been machine-learned by the determining unit 102 and are likely to be allowed in the same technical field as that of the invention created by a user. Further, the amendment information generating unit 111 may generate amendment information that adds the feature(s) of the invention that the user has created in the past in the same technical field as that of the invention created by the user. This allows the amendment information generating unit 111 to create a new invention on behalf of the user as well. The determining unit 102 may re-determine the possibility for obtaining a right related to the intellectual property based on the amendment information generated by the amendment information generating unit 111. The re-determination of the possibility of obtaining a right related to the intellectual property improves the possibility of obtaining a right utilizing the amendment information generated by the amendment information generating unit 111.

Moreover, the amendment information generating unit 111 may generate a plurality of pieces of amendment information, and the determining unit 102 re-determines the possibilities of obtaining a plurality of rights based on the plurality of pieces of amendment information generated by the amendment information generating unit 111. The re-determination of the possibilities for obtaining the plurality of rights related to the generated pieces of the intellectual property allows the user to select the generated plurality of pieces of the amendment information in which the possibility of obtaining a right is high. For example, the amendment information generating unit 111 may allow the plurality of pieces of the amendment information to be sorted in descending order of the possibility of obtaining a right in the result of the re-determination to be presented to the user.

The value evaluating unit 112 evaluates a value of the right related to the intellectual property based on the information on the intellectual property obtained by the information obtaining unit 101. The value of the right related to the intellectual property is calculated, for example, by a cost approach, a market approach, or an income approach.

Calculation of the Value of Right by Cost Approach

The cost approach is a method of calculating the cost needed to obtain a right to be evaluated. To obtain the right, for example, the human, physical and financial costs until the invention is created, the cost related to the application, the cost related to the prosecution processes, and the cost related to the registration are needed. The value evaluating unit 112 calculates and integrates the costs from, for example, the possibility of obtaining a right determined by the determining unit 102, and the experiment records stored in the information storing unit 104 to calculate the value of the right by the cost approach.

Calculation of the Value of Right by Market Approach

The market approach is a method of calculating the value of the intellectual property with reference to other intellectual property to be compared. The other intellectual property to be compared corresponds to, for example, intellectual property similar to the intellectual property that the user wishes to calculate the value. The similar intellectual property corresponds to, for example, intellectual property where industrial application field, effect, or goods or services to be used are similar. In the market approach, the evaluation of buyers and sellers are calculated with reference to the similar intellectual property. The value evaluating unit 112 calculates the value of intellectual property to be evaluated based on, for example, sales of goods in which the similar intellectual property is used, licensing income of the similar intellectual property, or selling price of the right of the similar intellectual property.

Calculation of the Value of Right by Income Approach

The income approach is a method of calculating a value based on the profits that intellectual property produces in the future. The cost approach and the market approach calculate the value according to past performance. In contrast, the income approach predicts future cash flows to calculate the value. The future cash flows depend on, for example, the scale of implementation of projects such as sales of products in the future and the size of costs associated with the implementation of projects. The value evaluating unit 112 calculates the value of the intellectual property, for example, by predicting the sales of goods using the intellectual property and the needed costs.

The functional units of the information obtaining unit 101, the determining unit 102, the determination providing unit 103, the information storing unit 104, the information providing unit 105, the authentication information obtaining unit 106, the certificate information providing unit 107, the information collecting unit 108, the trend aggregating unit 109, the examination result obtaining unit 110, the amendment information generating unit 111, and the value evaluating unit 112 that the information processing apparatus 1 has are only examples of the functions of the information processing apparatus 1, and thus the functions that the information processing apparatus 1 has are not limited to these. For example, the information processing apparatus 1 need not have all of the above functions, and may have only some functions. Further, the information processing apparatus 1 may have other functions than those described above. For example, the information processing apparatus 1 may have an input function for setting functions and an output function for notifying the operating status of the apparatus by an LED lamp, for example.

Further, as described above, the functional units of the information processing apparatus 1 are embodied by software. However, at least one or more of the functional units of the information processing apparatus 1 may be embodied by hardware.

Further, any of the functional units of the information processing apparatus 1 may be implemented by dividing one functional unit into a plurality of functional units. Moreover, any two or more of the functional units of the information processing apparatus 1 may be integrated into one function and implemented. That is, FIG. 1 is a functional block diagram illustrating the functions of the information processing apparatus 1, and does not show that each of the functional units is composed of a separate program file, for example.

Further, the information processing apparatus 1 may be a device embodied by one casing or a system embodied by a plurality of devices connected via a network, for example. For example, the information processing apparatus 1 may embody a part or all of its functions by a virtual device such as a cloud service provided by a cloud computing system. That is, the information processing apparatus 1 may embody at least one or more of the functional units in other devices. Further, the information processing apparatus 1 may be a general-purpose computer such as a server device or a dedicated apparatus with limited functions.

Figure 2:
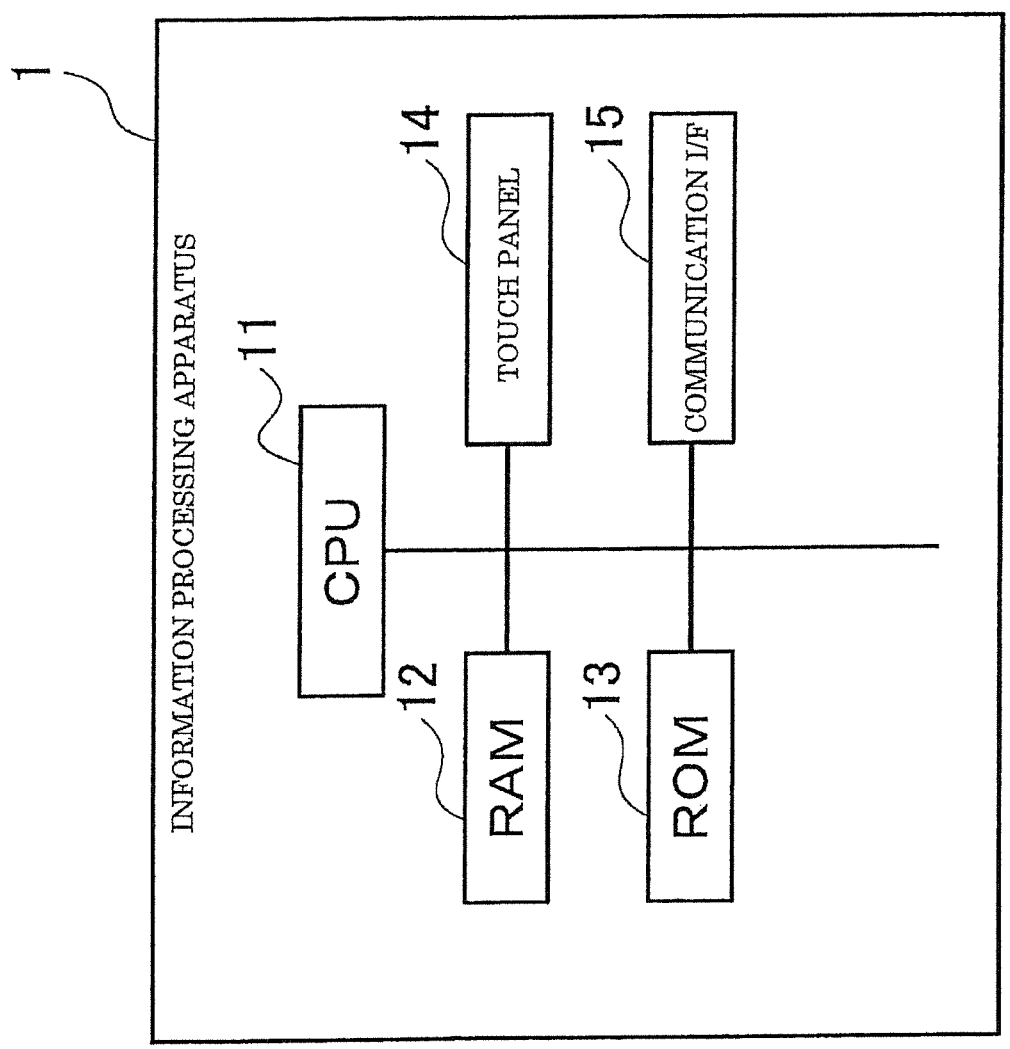
FIG. 2 is a block diagram illustrating an example of a hardware configuration of the information processing apparatus.

Next, with reference to FIG. 2, the hardware configuration of the information processing apparatus 1 will be described. FIG. 2 is a block diagram illustrating an example of the hardware configuration of the information processing apparatus 1 in the embodiment.

The information processing apparatus 1 includes a central processing unit (CPU) 11, a random access memory (RAM) 12, a read only memory (ROM) 13, a touch panel 14, and a communication interface (I/F) 15. The information processing apparatus 1 executes the information processing program described in FIG. 1.

The CPU 11 controls the information processing apparatus 1 by executing the information processing program stored in the RAM 12 or the ROM 13. The information processing program is obtained from, for example, a recording medium in which the information processing program is stored, or a program distribution server via network, installed in the ROM 13, read out from the CPU 11, and executed.

The touch panel 14 has an operation input function and a display function (operation display function). The touch panel 14 allows the user of the information processing apparatus 1 to perform an operation input using a fingertip or a touch pen. The information processing apparatus 1 according to this example uses the touch panel 14 having the operation display function. However, the information processing apparatus 1 may include a display device having a display function and an operation input device having an operation input function separately. In this case, the display screen of the touch panel 14 is embodied as the display screen of the display device, and the operation of the touch panel 14 is embodied as the operation of the operation input device. The touch panel 14 may be embodied in various forms such as a head mount display, a glasses display, and a wristwatch display.

The communication I/F 15 is an interface I/F for communication. The communication I/F 15 executes short-range wireless communication such as a wireless LAN, a wired LAN, and infrared, for example. The communication I/F 15 communicates with the user terminal 2 via the network 9, for example. The communication I/F 15 may embody communication with another information processing apparatus 1. FIG. 2 shows only the communication I/F 15 as communication I/F. However, the information processing apparatus 1 may have I/Fs for communication in a plurality of communication methods.

Figure 3:
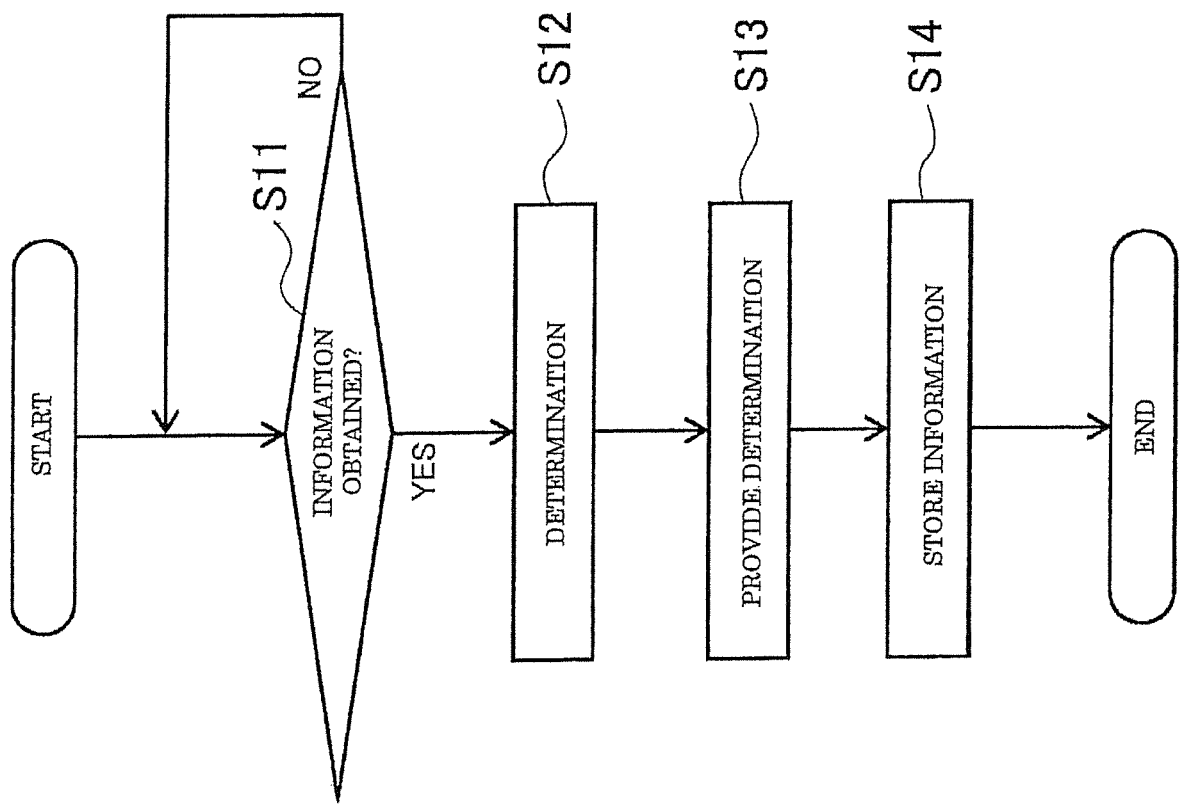
FIG. 3 is a flowchart illustrating a first operation example of an information processing program.

Next, the operation of the information processing program will be described with reference to FIGS. 3 to 6. FIG. 3 is a flowchart illustrating a first operation example of the information processing program in the embodiment. In the following description of the flowchart, it is assumed that the operations execution subject is the information processing apparatus 1. However, the operations may be executed by the corresponding functional units of the information processing apparatus 1 described above.

Obtaining, Determining and Storing the Information on the Intellectual Property

FIG. 3 shows an operation (first operation) of obtaining the information on the intellectual property, determining the possibility of obtaining a right, and storing the information in the information processing apparatus 1. In FIG. 3, the information processing apparatus 1 determines whether the information on the intellectual property is obtained from the user terminal 2 (step S11). Whether the information on the intellectual property is obtained is determined based on whether the information obtaining unit 101 obtains the information on the intellectual property entered through the user terminal 2. If it is determined that the information on the intellectual property is not obtained (step S11: NO), the information processing apparatus 1 repeats the process in step S11 and waits to obtain the information on the intellectual property.

In contrast, if it is determined that the information on the intellectual property is obtained (step S11: YES), the information processing apparatus 1 determines the possibility of obtaining a right related to the intellectual property on the basis of the obtained information on the intellectual property (Step S12). The determining unit 102 determines the possibility of obtaining a right on the intellectual property. The determination of the possibility of obtaining a right is determined as the possibility of "0%" to "100%," for example.

After executing the process in step S12, the information processing apparatus 1 provides the determination results in step S12 to the user terminal 2 through which the information on the intellectual property is entered (step S13). The determination result is provided by, for example, the determination providing unit 103, which provides the user terminal 2 with the display data of a character with an expression changed based on the determination result.

After executing the process in step S13, the information processing apparatus 1 stores the obtained information on the intellectual property in the user area associated with the user (step S14). The information storing unit 104 stores the information on the intellectual property. The information storing unit 104 may also store the determination result in step S12 in the process of step S14. After executing the process in step S14, the information processing apparatus 1 terminates the illustrated operation.

Figure 4:
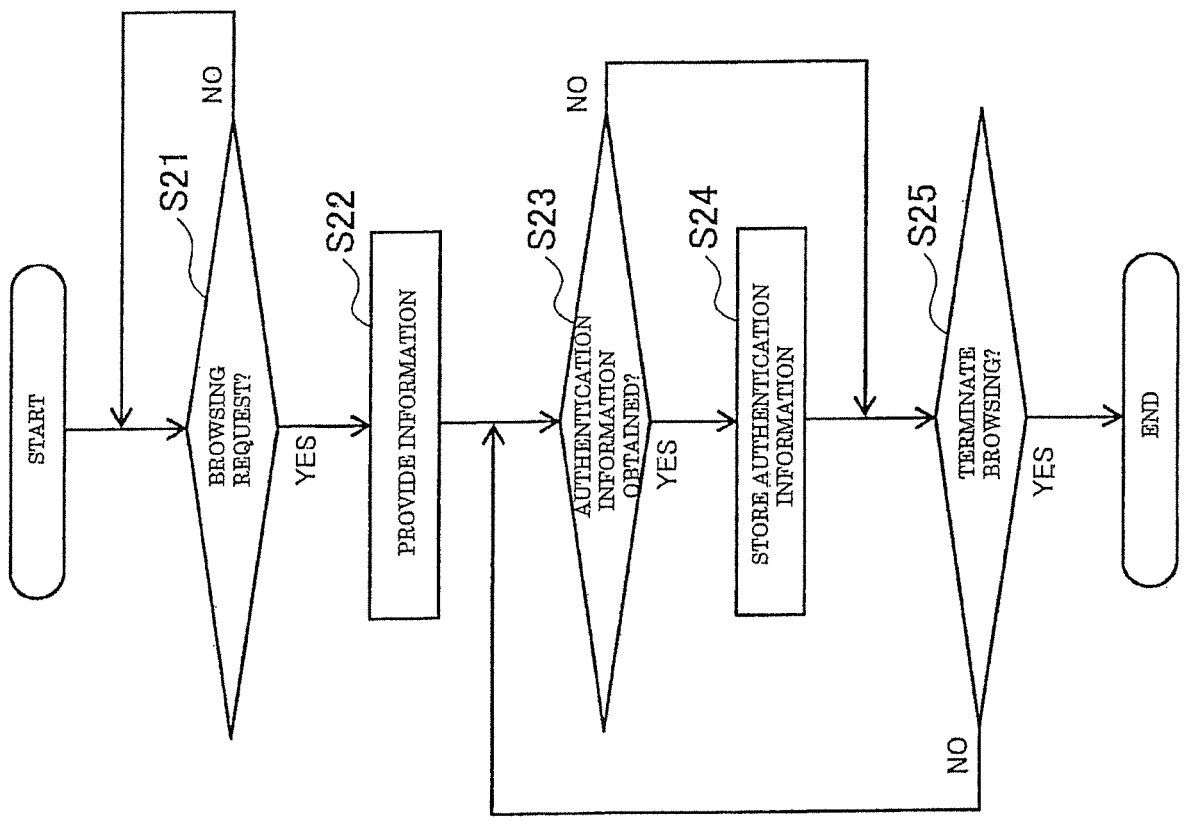
FIG. 4 is a flowchart illustrating a second operation example of the information processing program.

Provision, Authentication and Storage of the Information on the Intellectual Property FIG. 4 shows an operation (second operation) of provision, authentication, and storage of the information on the intellectual property in the information processing apparatus 1. In FIG. 4, the information processing apparatus 1 determines whether a browsing request from outside the information processing apparatus 1 (for example, user terminal 2) is obtained (step S21). Whether the browsing request is obtained is determined based on whether the information providing unit 105 obtains the browsing request. For example, when the information providing unit 105 is a Web server and provides a Web page to a Web browser such as the user terminal 2, the browsing request is obtained by operating a "browse" button on the Web page through the Web browser. In the browsing request, it is assumed that a login process of identifying the user (including the authenticator, for example) and checking the access authority to the information on the intellectual property is performed. The login process may be omitted by, for example, storing login information indicating that the login has succeeded once in the Web browser as a cookie (Hypertext Transfer Protocol (HTTP) cookie). If it is determined that there is no browsing request (step S21: NO), the information processing apparatus 1 repeats the process in step S21 and waits to obtain the browsing request.

In contrast, if it is determined that the browsing request is obtained (step S21: YES), the information processing apparatus 1 provides the information on the intellectual property (step S22). The information on the intellectual property is provided according to access authority to the information on the intellectual property. For example, when the access authority is given for only the browsing of the information, the information processing apparatus 1 provides the information on the intellectual property in a browsable manner. Further, when the access authority is given for the browsing and authentication of the information, the information processing apparatus 1 provides the information on the intellectual property so that it can be browsed and authenticated. Moreover, when the access authority permits all the operations such as editing and deleting the information, the information processing apparatus 1 provides the information on the intellectual property so that it can be edited or deleted, for example. Details of the information provided in step S22 will be described below.

After executing the process in step S22, the information processing apparatus 1 determines whether the authentication information is obtained (step S23). Whether the authentication information is obtained is determined based on whether the authentication information obtaining unit 106 obtains the authentication information through the terminal of the authenticator. When it is determined that the authentication information is obtained (step S23: YES), the information processing apparatus 1 stores the obtained authentication information (step S24). As for the storage of the authentication information, the authentication information obtaining unit 106 associates and stores the obtained authentication information with the information on the intellectual property to be authenticated. The information on the authenticated intellectual property associated with the authentication information is stored in a database utilizing the distributed ledger technology. This allows, in step S24, the information on the authenticated intellectual property to be stored such that it fails to be tampered with.

After executing the process in step S24 or when it is determined that the authentication information fails to be obtained (step S23: NO), the information processing apparatus 1 determines whether the browsing is terminated (step S25). Whether the browsing is terminated is determined, for example, based on whether the information providing unit 105 disconnects communication with the terminal that requested browsing. The disconnection of the communication is determined, for example, based on whether an explicit log off operation or an HTTP session timeout occurs. When it is determined that the browsing is not terminated (step S25: NO), the information processing apparatus 1 returns to the process in step S23 and repeats the processes in steps S23 to S25. In contrast, if it is determined that the browsing is terminated (step S25: YES), the information processing apparatus 1 terminates the illustrated operation.

Aggregation of Trends on the Intellectual Property

Figure 5:
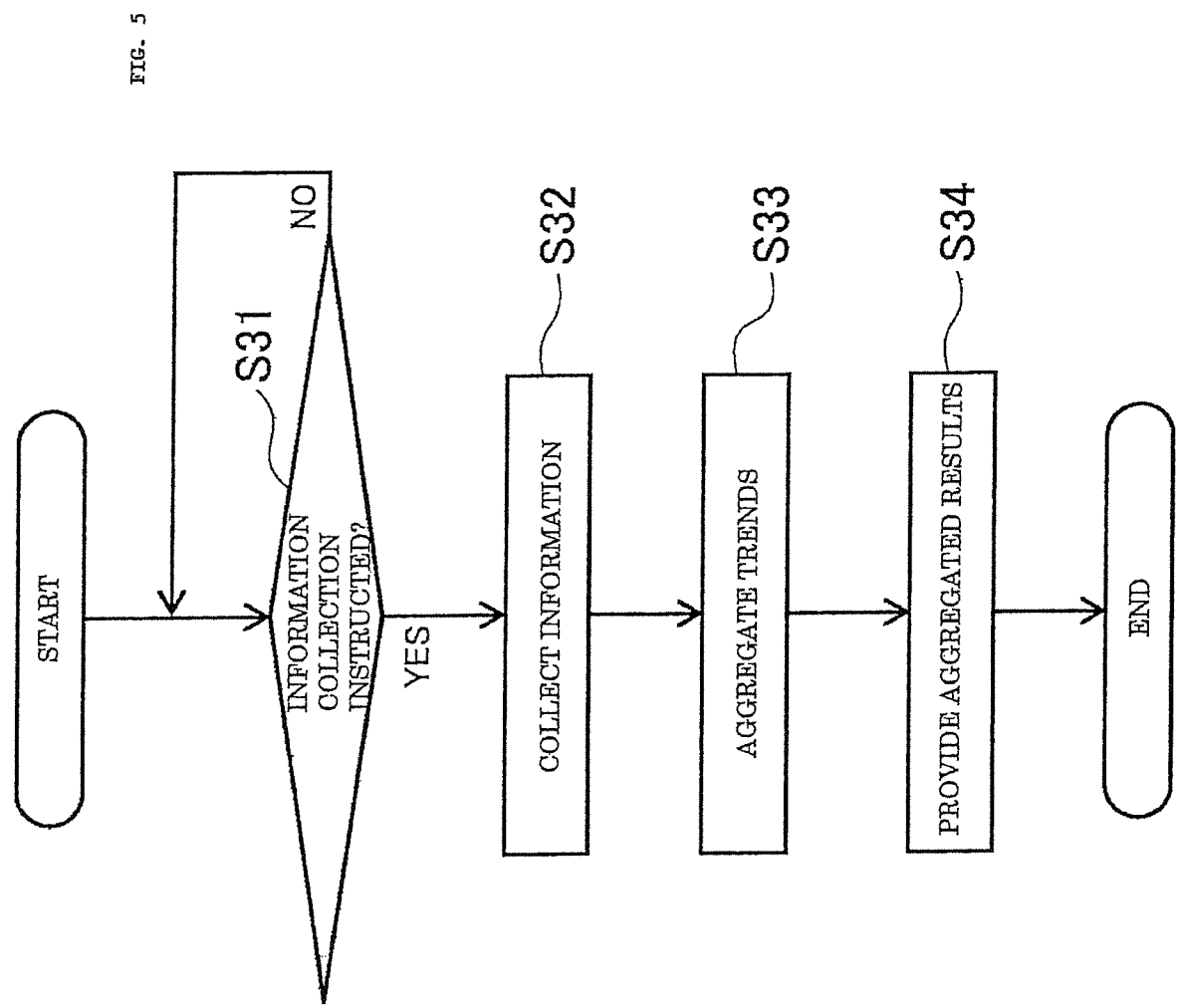
FIG. 5 is a flowchart illustrating a third operation example of the information processing program.

FIG. 5 shows an operation (third operation) of aggregating trends on the intellectual property in the information processing apparatus 1. In FIG. 5, the information processing apparatus 1 determines whether an information collection instruction is received (step S31). Whether the information collection instruction is received is determined based on whether the information collecting unit 108 receives the information collection instruction. The information collection instruction may be performed by a person authorized to browse all of the stored information on the intellectual property, who is specified by ISMS, for example. If it is determined that the information collection instruction is not received (step S31: NO), the information processing apparatus 1 repeats the process in step S31 and waits to receive the information collection instruction.

In contrast, if it is determined that the information collection instruction is received (step S31: YES), the information processing apparatus 1 collects the stored information on the intellectual property. The collection range of the information may be, for example, the browsable range of the person who has instructed the information collection, which is specified in the ISMS.

After executing the process in step S32, the information processing apparatus 1 aggregates trends of the information on the intellectual property (step S33). The trend aggregation is performed by the trend aggregating unit 109, which aggregates the trends of the information on the intellectual property based on the information on the intellectual property collected by the information collecting unit 108. In the process in step S33, for example, the keywords included in the information on the intellectual property may be sorted in order of usage frequency to form a list.

After executing the process in step S33, the information processing apparatus 1 provides the results aggregated in the process in step S33 (step S34). The aggregated result is provided to the user authorized to browse the web page by allowing the user to browse the web page, for example. After executing the process in step S34, the information processing apparatus 1 terminates the illustrated operation.

Machine Learning of Examination Results

Figure 6:
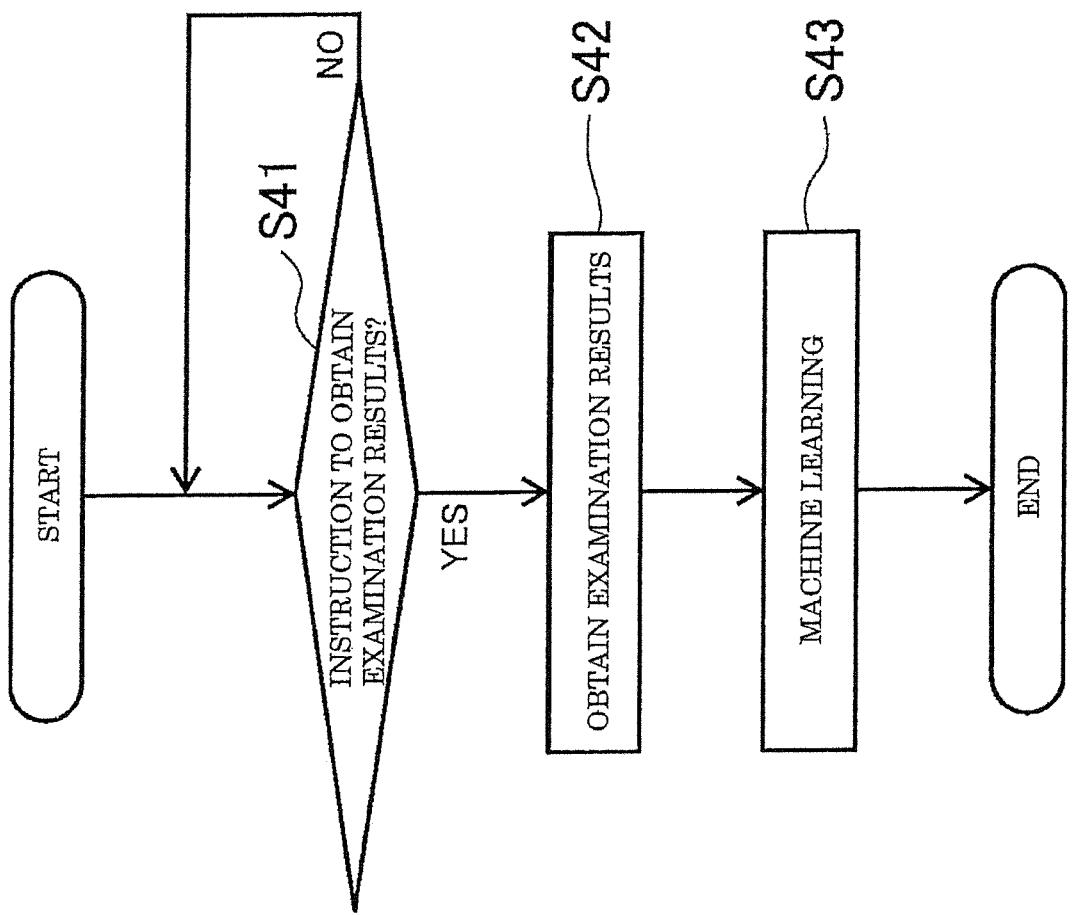
FIG. 6 is a flowchart illustrating a fourth operation example of the information processing program.

FIG. 6 shows a machine learning operation (fourth operation) of the examination results in the information processing apparatus 1. In FIG. 6, the information processing apparatus 1 determines whether an instruction to obtain the examination results is issued (step S41). Whether the examination result obtaining unit 110 is instructed to obtain the examination results is determined based on whether the examination result obtaining unit 110 receives an instruction to obtain the examination results. The instruction for obtaining the examination results may be automatically performed, for example, at predetermined time intervals (for example, once a week). If it is determined that the instruction to obtain the examination results is not given (step S41: NO), the information processing apparatus 1 repeats the process in step S41 and waits for the instruction of obtaining the examination results.

In contrast, if it is determined that the instruction to obtain the examination results is given (step S41: YES), the information processing apparatus 1 obtains the examination results (step S42). The examination results are obtained, for example, by the examination result obtaining unit 110, which downloads the examination progress and the data of the gazettes published by the patent offices in the countries. The examination progress may include information published internationally such as the examination results on the international applications based on the Patent Cooperation Treaty.

After executing the process in step S42, the information processing apparatus 1 machine-learns the obtained examination results (step S43). The machine learning of the examination results is performed by the determining unit 102, which machine-learns the examination results obtained in step S42. The learning results by machine learning may be used in the process in step S12. After executing the process in step S43, the information processing apparatus 1 terminates the illustrated operation.

The order of execution of the processes illustrated in the flowcharts is not limited to those illustrated. For example, the execution order of steps S13 and S14 may be reversed.

Next, with reference to FIG. 7, the information provided from the information processing apparatus 1 will be described. FIG. 7 is a diagram illustrating an example of the information provided from the information processing apparatus in the embodiment. FIG. 7 shows the provided information in a form of a table.

In FIG. 7, the provided information includes "registration date," "project number," "title," "object," "name," "belonging," "experiment records," "invention contents," "signature," "determination result," "amendment information" and "re-determination result." One row in the table in FIG. 7 shows information on intellectual property stored at one input. The provided information provided from the information processing apparatus 1 corresponds to information that is provided in a browsable manner based on the information on the intellectual property obtained through the user terminal 2 and stored.

The "registration date" is the date and time when the information on the intellectual property is entered and stored. If the once stored information is edited, the registration date may be the last edited date and time. Further, if the information on the intellectual property is stored through a plurality of times of inputs, the registration date may be the date and time when the information is finally stored. The registration date is a date and time that can be proved as the date and time when the intellectual property is created.

The "project number," "title," "purpose," "name," "belonging" and "experiment records" are requirements for the information processing apparatus 1 to serve as a laboratory note. The "project number" is the number of the project uniquely assigned in the R&D organization. The "title" is the title of the project. The "object" is the object of the project. The "name" is the name of the engineer who creates the intellectual property in the project. When a plurality of engineers are involved in the project in cooperation, the name may include the names of the engineers in cooperation. The "belonging" is a group to which the engineer belongs. The "experiment records" are information illustrating details of the experiment. The details of the experiment may include, for example, the experiment date, the experimental conditions, the specific materials, equipment used, and experimental data.

The "invention contents" are information indicating the contents of the invention created by the engineer. The invention contents are entered through the user terminal 2 and obtained. The contents of the invention may be expressed by words, chemical formulas, and calculation formulas, for example. When the contents of the invention are expressed in words, the contents of the invention may correspond to words, a natural language, or a row of keywords as recited in the claims. For example, it is assumed that the invention content "A" is a material having specific characteristics. The invention content "a1" is recognized as a material in a subordinate concept for material A. The invention content "a1+B" is a material obtained by mixing material a1 and material B. It is assumed that the invention content "C+D" is a software program including function C and function D. The invention content "C+d1" is a software program including the function C and a function d1 recognized as in a subordinate concept for the function D.

The "signature" is authentication information by the authenticator. The authenticator is, for example, a person that has authority to authenticate achievement in the projects. The signature is stored together with the date and time of authentication with respect to each stored piece of information on the intellectual property. For example, in FIG. 7, the signature is stored from Mar. 5 to Mar. 12, 2018, while being failed to be stored on Mar. 13 and Mar. 14, 2018. If the signature fails to be entered even after a predetermined number of days have elapsed from the registration date, the information processing apparatus 1 may notify the authenticator of the alert.

The "determination result" shows the possibility of obtaining a right to the entered invention contents. The "amendment information" is, for example, amendment information of the contents of the invention proposed by the information processing apparatus 1 when the determination result is less than 80%. For example, when the determination result of the invention content "A" is 30%, the information processing apparatus 1 proposes the amendment information "+H" which means that the material H associated with the material A may be mixed with the material A to improve a possibility of obtaining a right. The amendment information of the material H is generated and proposed based on the learning results of machine learning, for example, as described above. Further, when the determination result of the invention content "a1" is 40%, the information processing apparatus 1 proposes the amendment information "+J" which means that the material J associated with the material a1 may be mixed with the material a1 to improve a possibility for obtaining a right. In contrast, when the determination result of the invention content "a1+B" is 90%, the information processing apparatus 1 refrains from proposing amendment information.

The "re-determination result" is a result of re-determining the possibility for obtaining a right in consideration of the amendment information. For example, the re-determination result of the possibility of obtaining a right for the invention content "A+H" is 50%, which is 20% higher than 30% of the possibility for obtaining the right for the invention content "A."

The information providing unit 105 may provide display data in the table format shown in FIG. 7, or may provide display data in a Web page that displays each data item at a predetermined arrangement position, for example. For example, the display data that displays the information on the intellectual property displayed on one row in FIG. 7 may be provided on one page per case.

Figure 8:
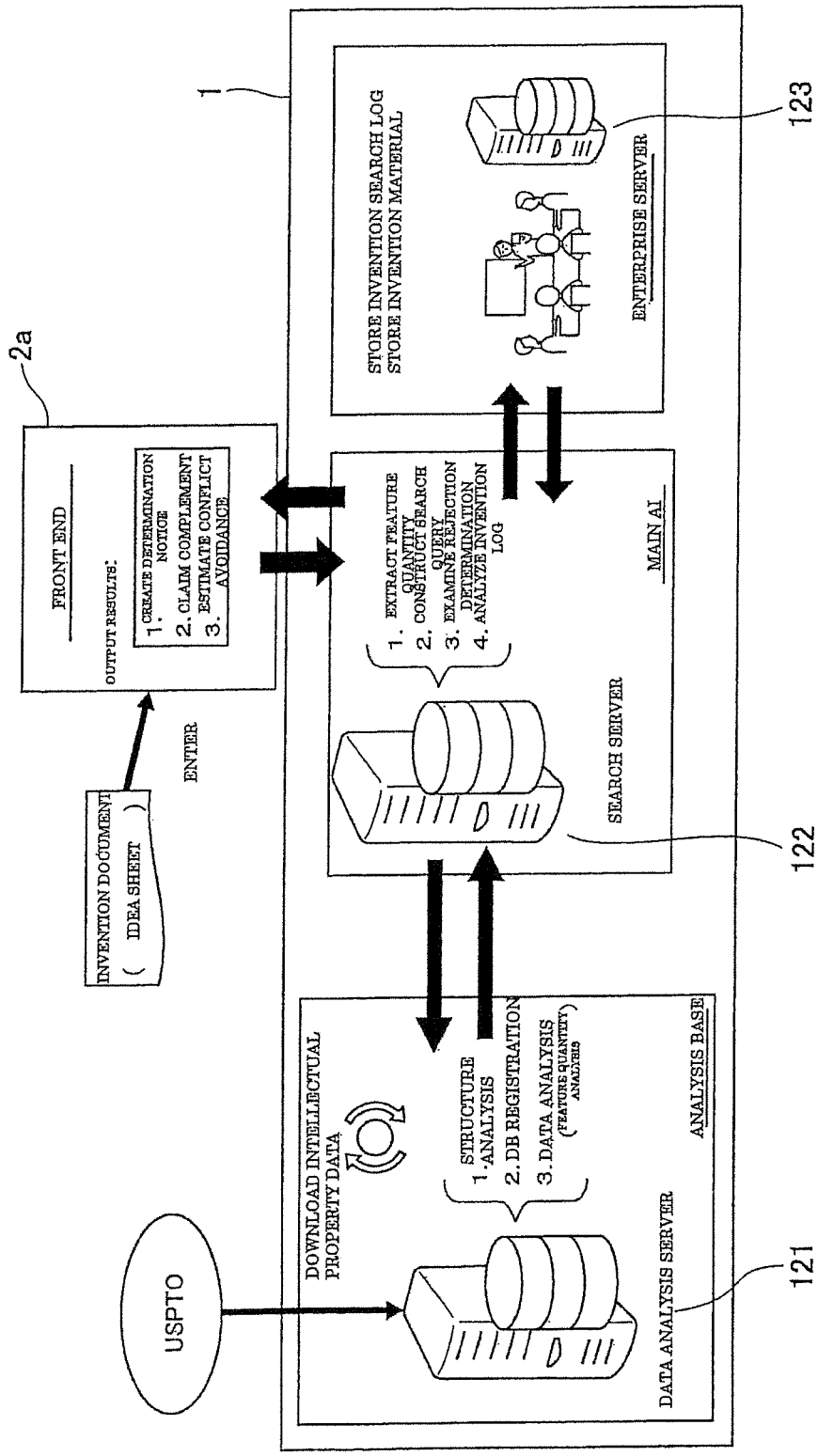
FIG. 8 is a diagram illustrating an example of a system configuration using the information processing apparatus.

Next, the system configuration in the information processing apparatus 1 will be described with reference to FIG. 8. FIG. 8 is a diagram illustrating an example of the system configuration using the information processing apparatus 1. In FIG. 8, the information processing apparatus 1 includes servers such as a data analysis server 121, a search server 122, and an enterprise server 123.

The data analysis server 121 serves as an analysis base in the information processing apparatus 1. The data analysis server 121 downloads intellectual property data from the United States Patent and Trademark Office (USPTO) as an example of a patent office. The data analysis server 121 analyzes the structure of sentences of the downloaded intellectual property data and registers the analysis results in a database. The intellectual property data may include, for example, a patent gazette issued by the USPTO (including a patent publication). The data analysis server 121 extracts the feature quantity of the sentences based on the analysis result registered in the database.

The search server 122 serves as a main AI in the information processing apparatus 1. The search server 122 obtains an invention document (for example, an idea sheet) entered through a front end 2a as an example of the user terminal 2, and extracts the feature quantity of the invention. The front end 2a is, for example, the user terminal 2. It is assumed that the invention document recites contents corresponding to the scope of claims (claims). The search server 122 decomposes the invention document into features, and extracts a feature quantity for each of the features. The search server 122 constructs a search query to search the data analysis server 121 based on the extracted feature quantity. The search by the search query is executed in a specific patent classification estimated from the feature quantity. The search server 122 transmits the search query to the data analysis server 121. The data analysis server 121 refers to the intellectual property data in the specific patent classification registered in the data analysis server 121 based on the search query to search for similar documents. The data analysis server 121 provides the search server 122 with the searched similar documents. The processes above may be executed in the information obtaining unit 101, for example. The maximum number of similar documents to be provided to the search server 122 may be set in the search query. When the number of similar documents to be provided is large, the number of documents to be determined is increased in the search server 122 so that the search accuracy improves, but it may take time to process. The maximum number of similar documents may be set, which allows consideration of the balance between the search accuracy and processing time.

The search server 122 examines the rejection determination by comparing the extracted feature quantity of the invention with the similar documents obtained from the data analysis server 121. The assessment of the rejection determination is executed for each feature in the invention document by comparing each feature with the similar documents. The search server 122 creates a determination notice to notify the possibility of obtaining a right for each feature as the determination result of the rejection determination. The determination providing unit 103 may create the determination notice, for example. The search server 122 also creates claim complement based on the determination result. The claim complement amends the feature of the invention to complement the claim. The amendment information generating unit 111 may perform the claim complement, for example. Further, the search server 122 may estimate avoidance of conflicts between the claims and the claims in similar documents. The avoidance of conflicts may be performed by generating amendments that avoid the same scope of claims.

The search server 122 stores in the enterprise server 123 the information (for example, log information of the invention search or invention materials) obtained from the data analysis server 121 or through the front end 2*a* or information generated by the search server 122. The information storing unit 104 may store the information, for example. The information stored in the enterprise server 123 is collected by the information collecting unit 108, and aggregated by the trend aggregating unit 109, for example. Also, the information may be used to generate the amendment information by the amendment information generating unit 111.

The search server 122 outputs the information of the generated determination result, claim complement or conflict avoidance estimation to the front end 2*a*. The determination providing unit 103 may output the information, for example. Further, the search server 122 may output the information stored in the enterprise server 123 to the front end 2*a*. The information providing unit 105 may output the information stored in the enterprise server 123, for example.

FIG. 8 shows an example of a system configuration using the information processing apparatus 1, and does not limit the system configuration using the information processing apparatus 1. For example, a system configuration for embodying all or part of the functions of the data analysis server 121, the search server 122, or the enterprise server 123 in the cloud server may be implemented.

Figure 9:
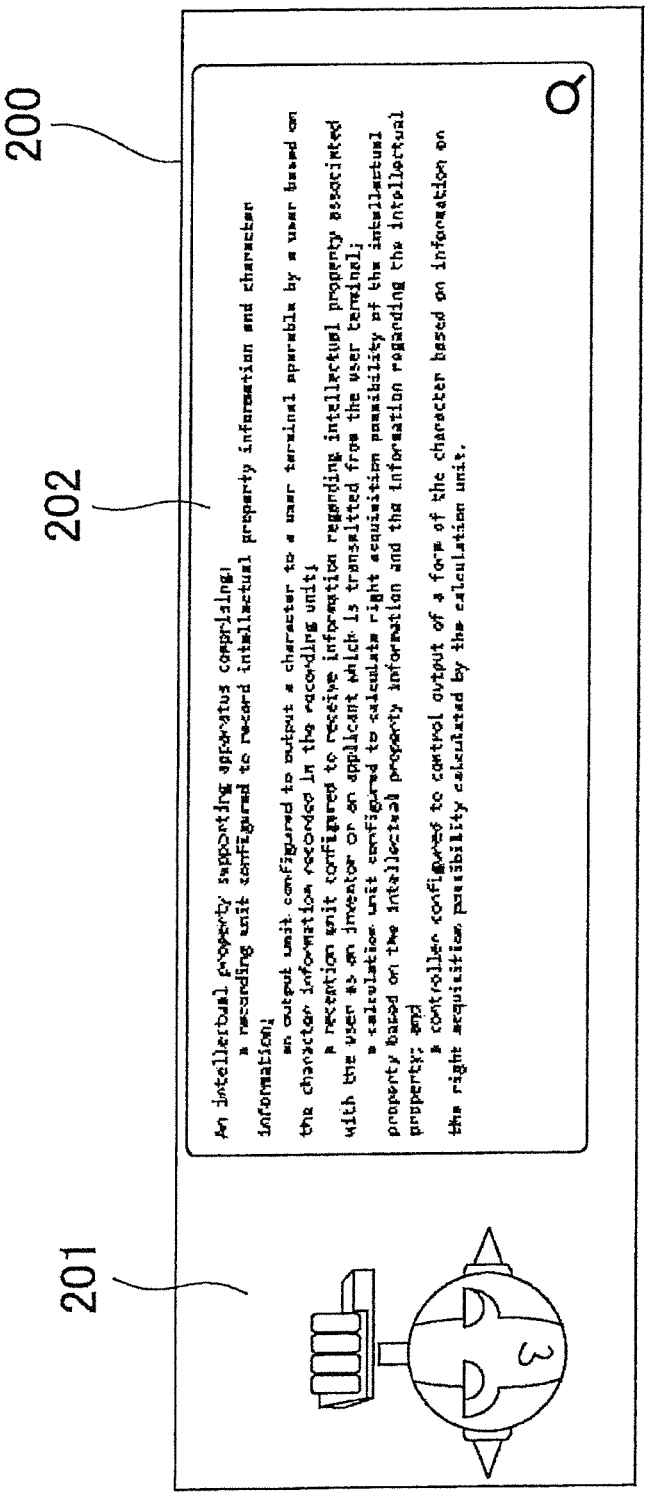
FIG. 9 is a diagram illustrating an example of a UI provided from the information processing apparatus.
Figure 10:
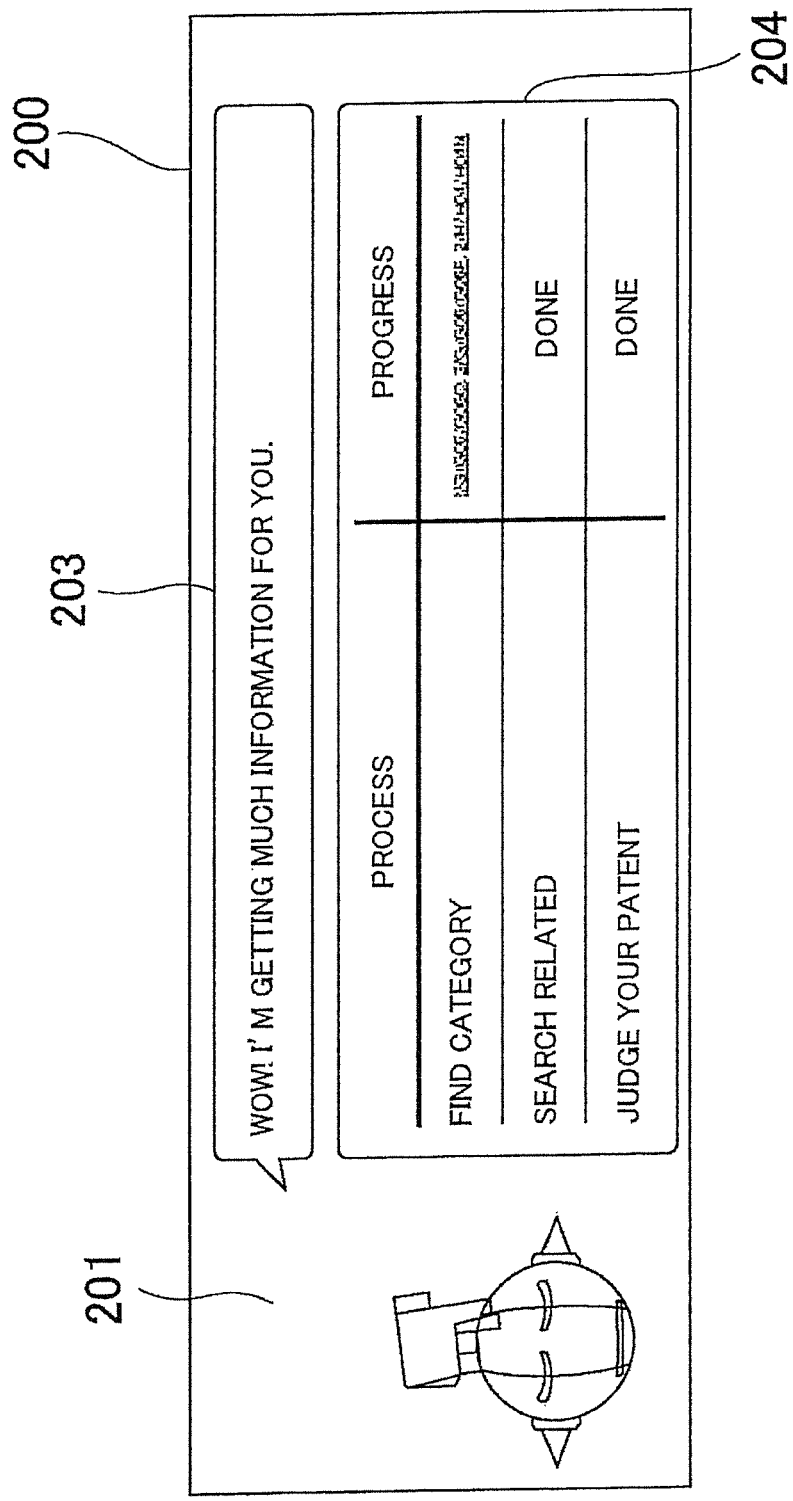
FIG. 10 is a diagram illustrating an example of the UI provided from the information processing apparatus.

Next, with reference to FIGS. 9 to 11, a User Interface (UI) provided from the information processing apparatus 1 and displayed on the user terminal 2 will be described. FIGS. 9 to 11 are diagrams illustrating examples of the UI provided from the information processing apparatus 1 in the embodiment.

FIG. 9 is a UI for entering the invention, provided from the information processing apparatus 1. In FIG. 9, IP Samurai 201 as a character of samurai is displayed on the display screen 200 of the user terminal 2. The IP Samurai 201 is displayed in a still image or a moving image, examines the invention in a dialogue with the user, and advises the amendment of the invention. The display screen 200 has an invention input unit 202. The invention input unit allows the user to enter claims of the invention. After entering the claims, the user clicks the magnifying glass mark to execute the examination.

FIG. 10 is a UI illustrating a processing state of the information processing apparatus 1. In FIG. 10, the display screen 200 displays the IP Samurai 201 with an expression showing that the IP Samurai 201 is determining (thinking). Also, a comment field 203 of the display screen 200 displays a comment from the IP Samurai 201. In the comment field 203, for example, when there is a problem in analysis of the entered invention, a comment indicating the details of the problem may be displayed.

A progress indication field 204 of the display screen 200 displays the progress of the determination. The progress status of the determination is displayed in three progress states, for example, "identification of patent classification of invention," "search for similar documents" and "determination."

FIG. 11 is a UI to notify the determination result of the invention provided from the information processing apparatus 1. In FIG. 11, the display screen 200 of the user terminal 2 displays the IP Samurai 201 which determines the possibility of obtaining a right as rank "B." The rank of the determination result may be rank S, rank A, rank B, and rank C, for example, in descending order of the possibility of obtaining a right. The IP Samurai 201 may change the expression according to the rank of the determination result.

Also, the determination table 205 of the display screen 200 displays the degree of coincidence for each feature of the invention. The degree of coincidence is, for example, a numerical value (%) indicating how much the feature quantity of the extracted invention is included in the similar documents (prior art documents), and shows that the higher the numerical value is, the more the features are disclosed in the prior art documents. The degree of coincidence for each feature is compared for each of the prior art documents to calculate the degree of coincidence. The first row of the determination table 205 displays the features of the decomposed invention. The second to fourth columns display the degree of coincidence with respect to the prior art documents.

The possibility of obtaining the right of the invention from which the feature quantity is extracted may be determined by, for example, the steps of selection of the main reference, recognition of the points of coincidence and difference between the invention and the main reference, selection of the secondary reference that describes differences, and determination of the possibility for obtaining the right. For example, as the main reference, a prior art document with the highest average ratio of coincidence with the features of the invention is selected. The points of coincidence and difference between the invention and the main reference are acknowledged based on whether the ratio of coincidence of the features of the invention is greater than or equal to a predetermined value. Also, as the secondary reference, a prior art document with a high ratio of coincidence for the features with low ratio of coincidence with the features in the main reference may be selected. The possibility of obtaining the right may be determined based on whether the average of the ratio of coincidence of the features of the main reference and the features of the secondary reference is greater than or equal to a predetermined value. The determination table 205 may include indications of the major and secondary references in the prior art documents and indications of the features of the main reference and the features of the secondary reference.

In the embodiment above, when the intellectual property is an invention is mainly described. However, for example, regarding the possibility of obtaining the right, the possibility of design registration or trademark registration may be determined.

A computer-readable recording medium may store programs that embody the functions of the apparatus described in the example, and the computer system may read and execute the program stored in the recording medium to perform the various processes of the example. The "computer system" referred to here may include an OS and hardware such as peripheral devices. Also, the "computer system" includes a website providing environment (or displaying environment) as long as it uses a WWW system. The term "computer-readable recording medium" refers to a storage device that may include a writable nonvolatile memory such as a flexible disk, a magneto-optical disk, a ROM, or a flash memory, a portable medium such as a CD-ROM, and a hard disk built in a computer system.

Further, "computer-readable recording medium" may include a memory that stores programs for a predetermined period of time such as a volatile memory (for example, Dynamic Access Memory DRAM (registered trademark)) inside a computer system serving as a server or a client when the programs are transmitted via a network such as the Internet or a communication line such as a telephone line. Moreover, the programs may be transmitted from a computer system in which the programs are stored in a storage device to another computer system via a transmission medium or by a transmission wave in the transmission medium. The "transmission medium" that transmits programs refers to a medium having a function of transmitting information, including a network (communication network) such as the Internet or a communication line such as a telephone line. Further, the programs may be for embodying a part of the functions above. Moreover, the programs may be difference file (difference program) that embodies the functions above in combination with the programs that have already been stored in the computer system.

Although the examples herein have been described with reference to the drawings, specific configurations are not limited to this disclosure, and various amendments are also included without departing from the spirit of the appended claims.

The invention claimed is:

1. An information processing apparatus comprising:
an information obtaining unit that obtains information on intellectual property from a user terminal operable by a user for each user area corresponding to the user, wherein the information is entered through the user terminal;
an examination result obtaining unit for obtaining an examination result of prior right obtaining as information on intellectual property which has been examined previously;
a determining unit that determines a possibility of obtaining a right related to the intellectual property of the user on the basis of criteria for determining the possibility of obtaining the right related to the intellectual property obtained through machine learning which utilizes the examination result of the prior right obtaining, in which one application and a citation for the one application are input and the examination result for the one application is output;
a determination providing unit that provides the user terminal with the determined possibility;
an amendment information generating unit that generates amendment information in which a constituent requirement acquired by improving a possibility of obtaining a right in a previous examination obtained through machine learning is proposed as a constituent requirement to be added to the information on the intellectual property of the user in accordance with the possibility for obtaining the right related to the intellectual property of the one user;
an information storing unit that stores the obtained information in the user area associated with the user; and
an information providing unit that provides the stored information in a browsable manner;
wherein the amendment information generating unit further generates the constituent requirement to be added on the basis of at least any of information on previous intellectual property of the user and information on previous intellectual property of another user associated with the user, which have been stored using the information storing unit, of the information on the intellectual property of the user;
wherein the determining unit re-determines the possibility for obtaining the right on the intellectual property based on the generated amendment information; and
further comprising a display screen that displays a determination table that is output in claim chart form and indicates a degree of coincidence for each feature of an invention embodied by the intellectual property and the information on intellectual property which has been examined previously.

2. The information processing apparatus according to claim 1, wherein the amendment information generating unit generates the amendment information that proposes deletion or addition of a feature in the obtained information.

3. The information processing apparatus according to claim 1, wherein the amendment information generating unit generates the amendment information further based on the stored information.

4. The information processing apparatus according to claim 1, wherein
the information storing unit associates and stores date and time when the information is obtained with the obtained information, and
the information providing unit provides the information associated with the date and time.

5. The information processing apparatus according to claim 1, wherein the information obtaining unit obtains the information created by the user based on the information provided in a browsable manner.

6. The information processing apparatus according to claim 1, wherein the information storing unit stores the obtained information using a distributed ledger technology.

7. The information processing apparatus according to claim 1, further comprising a certificate information providing unit that provides certificate information for certifying an existence of the stored information.

8. The information processing apparatus according to claim 1, further comprising an authentication information obtaining unit that obtains authentication information for authenticating the information provided in a browsable manner, wherein
the information storing unit associates and stores the obtained authentication information with the information.

9. The information processing apparatus according to claim 1, further comprising
an information collecting unit for collecting the information stored in a plurality of the user areas and
a trend aggregating unit for aggregating trends of the information based on the collected information.

10. The information processing apparatus according to claim 1, wherein
the amendment information generating unit generates a plurality of pieces of the amendment information, and
the determining unit re-determines the possibility for obtaining the right based on each of the generated plurality of pieces of the amendment information.

11. The information processing apparatus according to claim 1, further comprising a value evaluating unit for evaluating a value of the right related to the intellectual property based on the obtained information.

12. The information processing apparatus according to claim 1, wherein the amendment information generating unit simulates the information in the generated amendment information.

13. An information processing method comprising:
obtaining information on intellectual property from a user terminal operable by a user for each user area corresponding to the user, wherein the information is entered through the user terminal;
obtaining an examination result of prior right obtaining as information on intellectual property which has been examined previously;
determining a possibility of obtaining a right related to the intellectual property of the user on the basis of criteria for determining the possibility of obtaining the right related to the intellectual property obtained through machine learning which utilizes the examination result of the prior right obtaining, in which one application and a citation for the one application are input and the examination result for the one application is output;
providing the user terminal with the determined possibility;
generating amendment information for the obtained information in which a constituent requirement acquired by improving a possibility of obtaining a right in a previous examination obtained through machine learning is proposed as a constituent requirement to be added to the information on the intellectual property of the user in accordance with the possibility for obtaining the right related to the intellectual property of the one user;
storing the obtained information in a user area associated with the user;
providing the stored information in a browsable manner;
re-determining the possibility for obtaining the right on the intellectual property based on the generated amendment information; and
displaying a determination table that is output in claim chart form and indicates a degree of coincidence for each feature of an invention embodied by the intellectual property and the information on intellectual property which has been examined previously;
wherein the generating the amendment information generates the constituent requirement to be added on the basis of at least any of information on previous intellectual property of the user and information on previous intellectual property of another user associated with the user, which have been stored using the information storing unit, of the information on the intellectual property of the user.

14. A non-transitory computer-readable recording medium storing an information processing program for allowing a computer to execute functions of:
obtaining information on intellectual property from a user terminal operable by a user for each user area corresponding to the user, wherein the information is entered through the user terminal;
obtaining an examination result of prior right obtaining as information on intellectual property which has been examined previously;
determining a possibility of obtaining a right related to the intellectual property of the user on the basis of criteria for determining the possibility of obtaining the right related to the intellectual property obtained through machine learning which utilizes the examination result of the prior right obtaining, in which one application and a citation for the one application are input and the examination result for the one application is output;
providing the user terminal with the determined possibility;
generating amendment information for the obtained information in which a constituent requirement acquired by improving a possibility of obtaining a right in a previous examination obtained through machine learning is proposed as a constituent requirement to be added to the information on the intellectual property of the user in accordance with the possibility for obtaining the right related to the intellectual property of the one user;
storing the obtained information in a user area associated with the user;
providing the stored information in a browsable manner:
re-determining the possibility for obtaining the right on the intellectual property based on the generated amendment information; and
displaying a determination table that is output in claim chart form and indicates a degree of coincidence for each feature of an invention embodied by the intellectual property and the information on intellectual property which has been examined previously;
wherein the generating the amendment information generates the constituent requirement to be added on the basis of at least any of information on previous intellectual property of the user and information on previous intellectual property of another user associated with the user, which have been stored using the information storing unit, of the information on the intellectual property of the user.

\* \* \* \* \*